United States Patent
Yang

(10) Patent No.: US 10,670,775 B2
(45) Date of Patent: Jun. 2, 2020

(54) MANUFACTURING METHODS OF ANTI-GLARE COVERS, ANTI-GLARE COVERS, AND DISPLAY PANELS

(71) Applicant: Wuhan China Star Optoelectronics Technology Co., Ltd., Wuhan, Hubei (CN)

(72) Inventor: Yong Yang, Guangdong (CN)

(73) Assignee: Wuhan China Star Optoelectronics Technology Co., Ltd, Wuhan, Hubei (CN)

(*) Notice: Subject to any disclaimer, the term of this patent is extended or adjusted under 35 U.S.C. 154(b) by 247 days.

(21) Appl. No.: 15/552,938

(22) PCT Filed: Jun. 26, 2017

(86) PCT No.: PCT/CN2017/089934
§ 371 (c)(1),
(2) Date: Aug. 23, 2017

(87) PCT Pub. No.: WO2018/223432
PCT Pub. Date: Dec. 13, 2018

(65) Prior Publication Data
US 2018/0348407 A1    Dec. 6, 2018

(30) Foreign Application Priority Data
Jun. 5, 2017 (CN) .......................... 2017 1 0413965

(51) Int. Cl.
*G02B 1/111* (2015.01)
*G02B 5/02* (2006.01)
(52) U.S. Cl.
CPC ............ *G02B 1/111* (2013.01); *G02B 5/0226* (2013.01); *G02B 5/0268* (2013.01); *G02B 5/0294* (2013.01)

(58) Field of Classification Search
CPC .... G02B 1/111; G02B 5/0294; G02B 5/0268; G02B 5/0226
See application file for complete search history.

(56) References Cited

U.S. PATENT DOCUMENTS

2007/0231558 A1    10/2007    Kamatani et al.
2007/0247711 A1*   10/2007    Ohtani ..................... B05D 1/38
                                                            359/487.05
(Continued)

FOREIGN PATENT DOCUMENTS

JP    2007057612 A    3/2007
JP    2013171106 A    9/2013
(Continued)

OTHER PUBLICATIONS

Vert et al, 2012, Terminology for biorelated polymers and applications (IUPAC Recommendations 2012), Pure Appl. Chem., vol. 84, No. 2, pp. 377-410, (Year: 2012).*

*Primary Examiner* — Nathan L Van Sell
(74) *Attorney, Agent, or Firm* — Andrew C. Cheng

(57) ABSTRACT

The present disclosure relates to a manufacturing method of anti-glare covers, an anti-glare cover, and a display panel. The method includes: forming a layer configured with a plurality of micron-sized inorganic particles on a surface of a cover, forming a layer of organic compound on the inorganic particles, conducting a high temperature rolling treatment on the cover to melt and transform the organic matter into a viscous flow state, conducting a cooling process on the cover. The inorganic particles are fixed by a film formed by the organic compound such that the inorganic particles are distributed on the substrate.

5 Claims, 2 Drawing Sheets

(56) References Cited

U.S. PATENT DOCUMENTS

| | | | |
|---|---|---|---|
| 2007/0253066 A1 | 11/2007 | Takao et al. | |
| 2009/0015927 A1 | 1/2009 | Matsumura et al. | |
| 2009/0290220 A1 | 11/2009 | Nagahama et al. | |
| 2012/0164413 A1* | 6/2012 | Hara | B29C 70/606 |
| | | | 428/212 |
| 2016/0137873 A1 | 5/2016 | Kostromine et al. | |
| 2017/0123108 A1 | 5/2017 | Kobori | |

FOREIGN PATENT DOCUMENTS

| | | |
|---|---|---|
| JP | 20140224920 A | 12/2014 |
| KR | 1020150079052 A | 7/2015 |

* cited by examiner

MANUFACTURING METHODS OF ANTI-GLARE COVERS, ANTI-GLARE COVERS, AND DISPLAY PANELS

BACKGROUND

1. Technical Field

The present disclosure relates to optical display field, and particularly to a manufacturing method of anti-glare covers, an anti-glare cover, and a display panel.

2. Description of Related Art

With the evolution of the technology, mobile phones have been widely adopted. Usually, an anti-glare treatment is conducted on the surface of the cover of the mobile phones to prevent the users from the interference of the glare and the ghosting under the high brightness environment. Conventionally, the anti-glare treatment may include an etching process and a spray process. However, the etching process may be accompanied with acid solution. The manufacturing process of the etching process is complex, and the waste etching liquid has to be disposed to prevent the environment from being polluted by the waste etching liquid, which may result in high costs. The adhesion of the particles on the cover from by conducting the spray process is not strong enough, which may reduce the anti-glare performance.

SUMMARY

The present disclosure relates to a manufacturing method of anti-glare covers, an anti-glare cover, and a display panel, so as to guarantee the anti-glare performance, to simplify the manufacturing process, and to reduce the costs.

In one aspect, the present disclosure relates to a manufacturing method of anti-glare covers, including: forming a layer configured with a plurality of micron-sized inorganic particles on a surface of a cover; forming a layer of organic compound on the inorganic particles; conducting a high temperature rolling treatment on the cover to melt and transform the organic layer into a viscous flow state; conducting a cooling process on the cover, wherein the inorganic particles are fixed by a film formed by the organic compound such that the inorganic particles are distributed on the substrate.

In another aspect, the present disclosure relates to an anti-glare cover, including: a substrate; an anti-glare film covering the substrate; wherein the anti-glare film is configured with a rugged structure formed by conducting a high temperature rolling process and a cooling process on a plurality of micron-sized inorganic particles and organic compound in sequence, and wherein the inorganic particles are fixed by a film formed by the organic compound such that the inorganic particles are distributed on the substrate.

In another aspect, the present disclosure relates to a display device, including: a substrate; an anti-glare film covering the substrate; wherein the anti-glare film is configured with a rugged structure formed by conducting a high temperature rolling process and a cooling process on a plurality of micron-sized inorganic particles and organic compound in sequence, and wherein the inorganic particles are fixed by a film formed by the organic compound such that the inorganic particles are distributed on the substrate.

In view of the above, the organic matter melts and is transformed into a viscous flow state by conducting the high temperature rolling treatment. As such, the inorganic particles may not form the agglomeration within the melted organic compound, and to guarantee the uniform distribution of the inorganic particles. After conducting the cooling process, the melted organic compound is cured. The inorganic particles are fixed above the surface of the cover, and to from a rugged microstructure. As such, the adhesion of the particles on the cover may be improved, and the anti-glare performance may be guaranteed. The acid etching solution and the waste etching liquid disposal process may be excluded, such that the manufacturing process may be simplified, and may reduce the costs.

DETAILED DESCRIPTION

To clarify the purpose, technical solutions, and the advantages of the disclosure, embodiments of the invention will now be described more fully hereinafter with reference to the accompanying drawings, in which embodiments of the invention are shown. The figure and the embodiment described according to figure are only for illustration, and the present disclosure is not limited to these embodiments.

Figure 1:
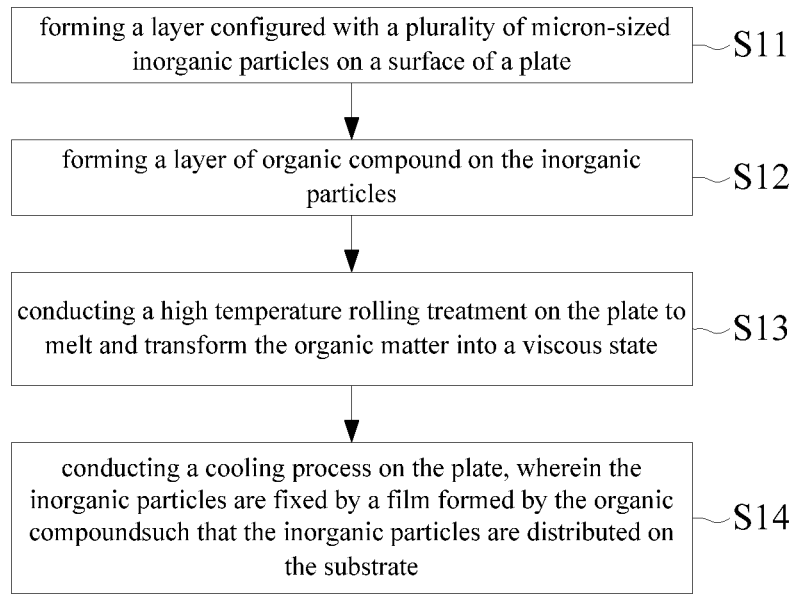
FIG. 1 is a flowchart illustrating a manufacturing method of an anti-glare cover in accordance with one embodiment of the present disclosure.
Figure 2:
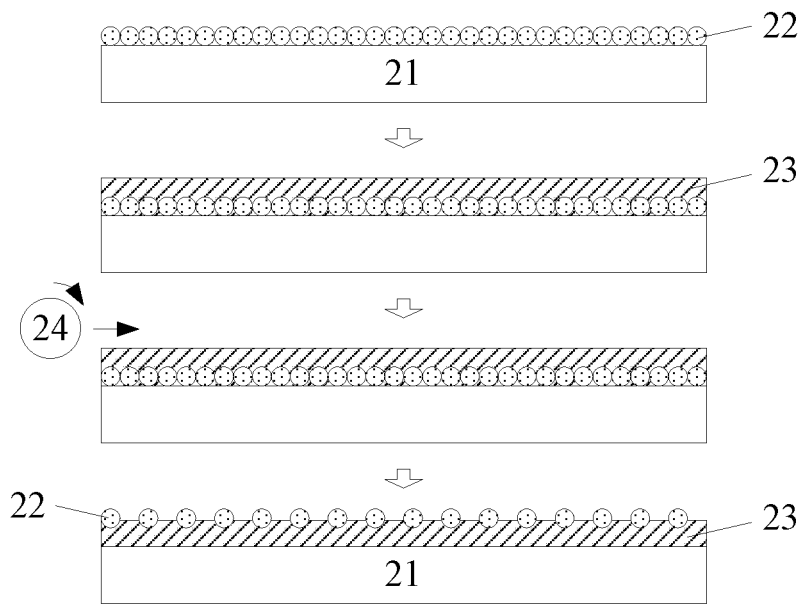
FIG. 2 is a schematic view of an anti-glare cover manufactured by the manufacturing method shown in FIG. 1.

Referring to FIG. 1 and FIG. 2, the present disclosure relates to a manufacturing method of anti-glare covers. The method may include the following steps.

In step S11: forming a layer configured with a plurality of micron-sized inorganic particles on a surface of a cover.

In one example, the cover 21 may be a glass substrate or a plastic substrate configured on an outer side of electrical devices, wherein the electrical devices may be, but not limited to, mobile phones, personal digital assistant (PDA), or wearable devices.

A spray process is conducted to form a layer configured with a plurality of inorganic particles 22. Specifically, the inorganic particles 22 are injected into a cavity of a nozzle, wherein an adjustable outlet is configured on a top of the nozzle. A relative motion is in between the cover 21 and the nozzle. The inorganic particles 22 are ejected from the outlet of the nozzle during the motion, and are uniformly distributed on the surface of the cover 21. The amount of the inorganic particles 22 on the surface of the cover 21 is controlled by a size of the adjustable outlet.

The inorganic particles 22 are made of at least one of, but not limited to, glass fiber or aluminum oxide ($Al_2O_3$).

Before conducting the spray process, a cleaning process is conducted on the cover 21 to remove impurities on the surface of the cover 21. For example, when the cover 21 is made of polyethylene terephthalate or polyimide, the cover 21 may be immersed into a mixture of sulfuric acid and hydrogen peroxide in a volume ratio of 1:1. The sulfuric acid may accelerate the hydrogen peroxide to produce a large amount of oxygen, and the oxygen may bring the impurities away from the surface of the cover 21, so as to complete the cleaning process quickly.

In step S12: forming a layer of organic compound on the inorganic particles.

In one example, a cast coating process is conducted to from the layer of organic compound 23. Specifically, the organic compound 23 is injected into a cavity of a coating head, wherein an adjustable outlet is configured on a top of the coating head. A relative motion is in between the cover 21 and the coating head. The organic compound 23 is ejected from the coating head and is uniformly coated on the inorganic particles 22. The amount of the organic compound 23 is controlled by a size of the adjustable outlet. In another, example, the spray process may be conducted to from the layer of the organic compound 23 on the inorganic particles 22.

In one example, the organic compound 23 may be made of at least one of, but not limited to, polyethylene (PE) or polymethylmethacrylate (PMMA).

In step S13: conducting a high temperature rolling treatment on the cover to melt and transform the organic layer into a viscous flow state.

The operation temperature of the high temperature rolling treatment is higher than the melting point of the organic compound 23. In one example, the inorganic particles 22 may be made of glass fiber and the organic compound 23 may be made of PMMA, wherein the content of glass fiber and PMMA may be in 60 percent and 40 percent respectively. The melting point of PMMA is in a range between 130° C. to 140° C., and thus the operation temperature of the high temperature rolling treatment may be at 150° C.

A roller 24 is heated during the high temperature rolling treatment. A rolling process is conducted on the organic compound 23 via the roller 24, and the organic compound 23 may be melted and transformed into the viscous flow state. However, the inorganic particles 22 may not be melted. The melted organic compound 23 may have fluidity. The rolling process is conducted on the melted organic compound 23 via the roller 24 to form a layer structure having a uniform thickness. The inorganic particles 22 may be moved within the melted organic compound 23 due to the rolling process conducted by the roller 24, and the inorganic particles 22 may be uniformly distributed within the melted organic compound 23. The inorganic particles 22 may not form an agglomeration within the melted organic compound 23 due to the viscosity of the organic compound 23, as such, the uniform distribution of the inorganic particles 22 within the organic compound 23 may be guaranteed.

In step S14: conducting a cooling process on the cover, wherein the inorganic particles are fixed by a film formed by the organic compound such that the inorganic particles are distributed on the substrate.

After conducting the cooling process, the melted organic compound 23 is cured to form the film. The inorganic particles 22 are wrapped by the organic compound 23, as such a surface of the film may have a rugged structure. The rugged structure may scatter light beams, so as to realize the anti-glare effect. In one example, the rugged structure may be a micron-sized rugged microstructure. However, a thickness of the film formed by conducting the rolling process on the melted organic compound 23 via the roller 24 is uniform, and the size of the roller 24 is much greater than micron-size, as such, the roller 24 may have no inference on the formation of the micron-sized rugged structure.

When being compared with the conventional spray process, the organic compound 23 is cured and the inorganic particles 22 are fixed above the surface of the cover 21, as such, the adhesion of the inorganic particles 22 of the cover 21 may be enhanced, the inorganic particles 22 may not easily be peeled off, and the abrasion resistant may be improved, so as to improve the anti-glare performance.

When being compared with the conventional etching process, the acid etching solution and the waste etching liquid disposal process may be excluded, such that the manufacturing process may be simplified, and may reduce the costs.

Figure 3:
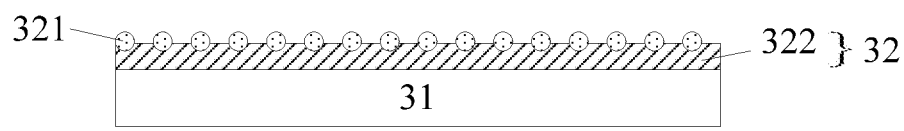
FIG. 3 is a cross sectional view of an anti-glare cover in accordance with one embodiment of the present disclosure.

Referring to FIG. 3, the present disclosure relates to an anti-glare cover. The anti-glare cover 30 may include the substrate 31 and an anti-glare film 32 covering the substrate 31. In one example, the substrate 31 is configured to be the cover configured on the outer side of the screen of the electrical device, and has the same function with the cover 21 shown in FIG. 1. Wherein the anti-glare film 32 is configured with the rugged structure formed by conducting the high temperature rolling process and the cooling process on the micron-sized inorganic particles 321 and the organic compound 322 in sequence, and the organic compound 322 is cured to form the film configured to fix the inorganic particles 321 above the substrate 31.

The high temperature rolling process and the cooling process are the same with the above, and may not be described again. The anti-glare cover 30 is manufactured by the manufacturing method shown in FIG. 1 and FIG. 2, and may have the same function.

Figure 4:
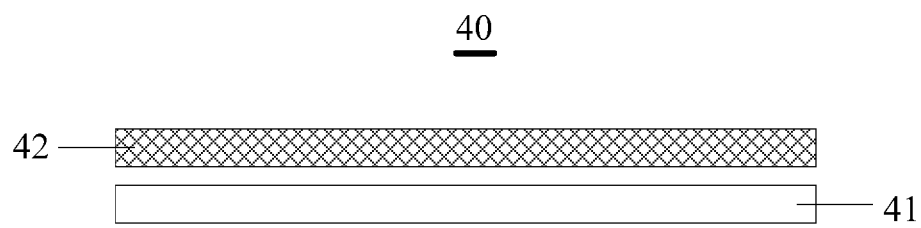
FIG. 4 is a cross sectional view of a display device in accordance with one embodiment of the present disclosure.

The present disclosure further relates to a display device, as shown in FIG. 4, the display device 40 may include the display panel 41 and the anti-glare cover 42, wherein the anti-glare cover 41 is configured on a light beams outputting direction of the display panel 41. In one example, the display panel 41 may be, but not limited to, a liquid display panel or an organic light-emitting diode (OLED) display panel. The anti-glare cover 42 may have the same structure and the same function with the anti-glare cover 30 shown in FIG. 3.

The above description is merely the embodiments in the present disclosure, the claim is not limited to the description thereby. The equivalent structure or changing of the process of the content of the description and the figures, or to implement to other technical field directly or indirectly should be included in the claim.

What is claimed is:

1. A manufacturing method of anti-glare covers, comprising:
    forming a layer configured with a plurality of inorganic particles on a surface of a cover;
    forming a layer of organic compound on the inorganic particles;
    conducting a high temperature rolling treatment on the cover to melt and transform the organic layer into a viscous flow state;
    conducting a cooling process on the cover, wherein the inorganic particles are fixed by a film formed by the organic compound such that the inorganic particles are distributed on the substrate.

2. The manufacturing method of anti-glare covers according to claim 1, wherein a refractive index of the organic compound is the same with a refractive index of the inorganic particles.

3. The manufacturing method of anti-glare covers according to claim 1, wherein the inorganic particles are made of at least one of glass fiber or alumina ($Al_2O_3$).

4. The manufacturing method of anti-glare cover according to claim 1, wherein the organic compound is made of at least one of polyethylene or polymethylmethacrylate (PMMA).

5. The manufacturing method of anti-glare cover according to claim 1, wherein before forming the layer configured with the inorganic particles, the method further comprises:
conducting a cleaning process on the surface of the cover.

* * * * *